Aug. 23, 1932.    C. F. MEYER    1,873,007

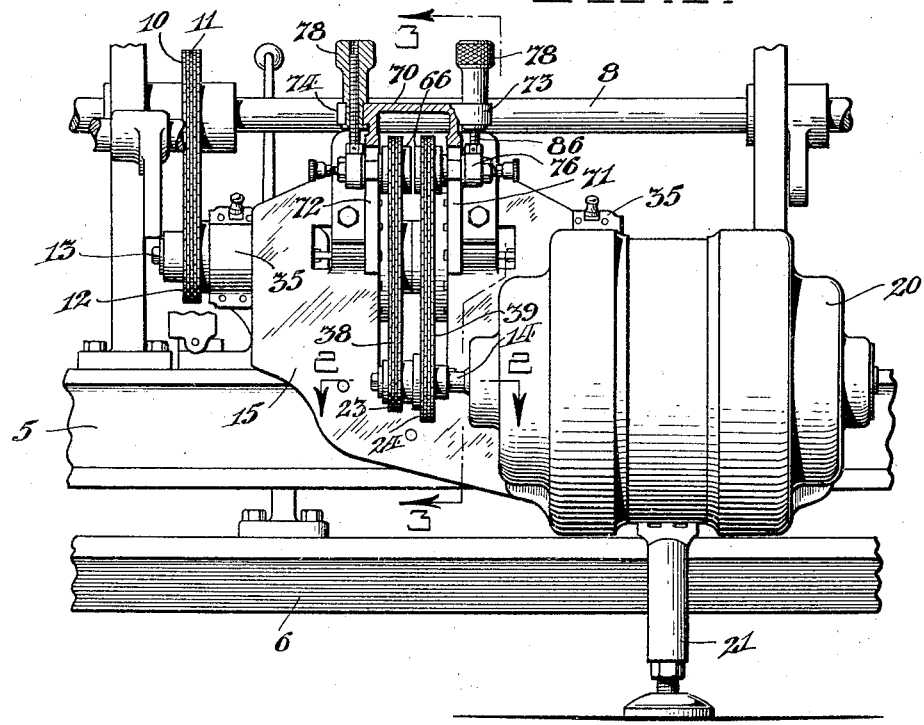

VARIABLE SPEED DRIVE MECHANISM

Filed Nov. 14, 1928    2 Sheets-Sheet 2

INVENTOR:
Christian F. Meyer,
BY
ATTORNEYS

Patented Aug. 23, 1932

1,873,007

UNITED STATES PATENT OFFICE

CHRISTIAN F. MEYER, OF WYOMISSING, PENNSYLVANIA, ASSIGNOR TO TEXTILE MACHINE WORKS, OF WYOMISSING, PENNSYLVANIA, A CORPORATION OF PENNSYLVANIA

VARIABLE SPEED DRIVE MECHANISM

Application filed November 14, 1928. Serial No. 319,206.

My invention relates to full fashioned knitting machines, and more particularly to an improved variable speed drive mechanism therefor, my primary object being to provide a simple, compact, unitary structure of cooperative parts, readily assembled and jointly mounted on the usual machine frame, a series of change speeds being simply controlled by a clutch mechanism, and other series of changes being provided for by a novel and easily effected replacement of a drive gear unit.

It is well known in the art that during the process of knitting a stocking or the like on a full fashioned knitting machine, certain portions thereof may advantageously be more rapidly and economically produced by an increase of machine speed over necessarily slower speed for the production of other portions, and furthermore that the ratio of such speed change possibilities will vary in accordance with the materials employed and special knitting requirements. For this purpose variable speed drives have heretofore been employed of both the mechanical and electric motor type, but all with more or less inherent disadvantages as to cost, unreliability and waste of power.

My improved drive mechanism preferably comprises a motor unit and a variable speed power transmitting unit jointly carried in cooperative relation on a combining support mounted on the machine frame; the motor unit consisting of an economical single-speed electric motor with the drive shaft provided with a removable multi-gear mounting, and the transmitting unit consisting of a shaft having selective clutch controlled gears connected to the motor drive gears, the connecting transmission means extending over idler gears separately adjustable to facilitate change of speed ratios.

My improved construction and its operation are fully set forth and described in the following specification, in connection with the drawings accompanying the same and forming part thereof, and the novel features which I desire to protect by Letters Patent are particularly set forth in the subjoined claims.

Fig. 1 is a fragmentary rear view of a usual full-fashioned knitting machine sufficient to disclose a preferred embodiment of my improved variable speed drive mechanism applied thereto in operative position.

Fig. 2 is an enlarged detail view, partly in longitudinal cross section on the line 2—2 of Fig. 1, showing a fragmentary portion of the motor shaft and the removably mounted gear unit thereon.

Figure 3:
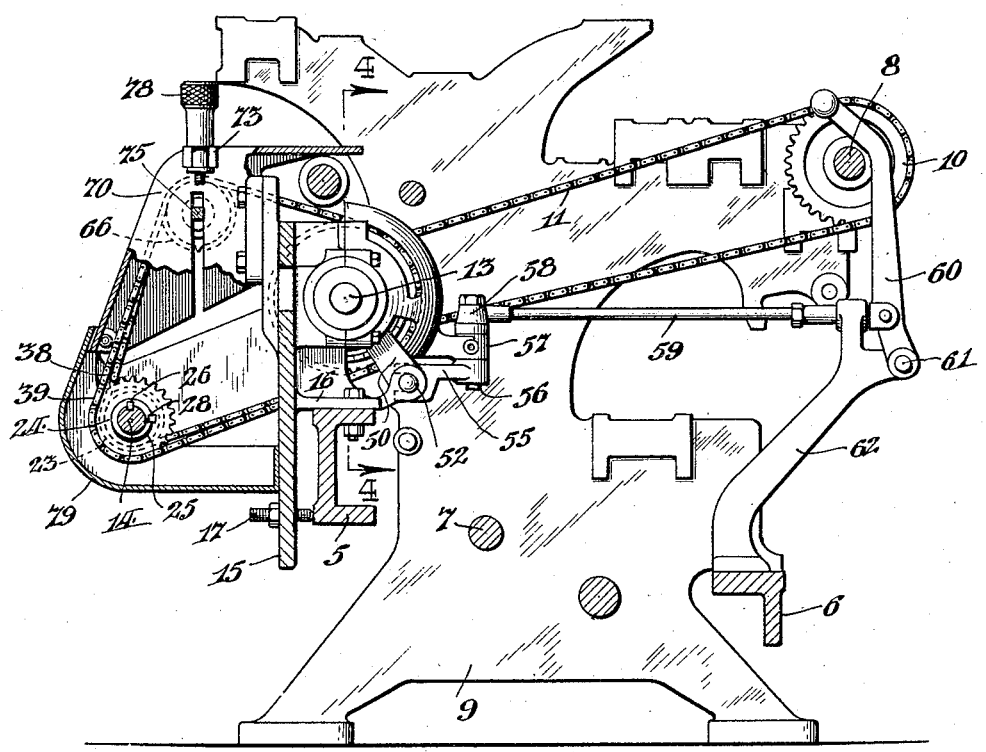
Fig. 3 is a fragmentary cross sectional view of the machine, taken on the line 3—3 of Fig. 1, part of the transmission casing being broken away.

The known usual knitting machine structure indicated in the drawings comprises a rear frame-beam or rail 5, a front frame beam or rail 6, a main cam shaft 7, and a power driven hand wheel shaft 8, said frame beams as heretofore being fixedly secured to and carried by a usual series of longitudinally disposed frame standards 9, and the latter having suitable bearing supports for the shafts 7 and 8. Cam shaft 7 is commonly driven in well known manner not indicated in the drawings, by suitable connections to hand wheel shaft 8, and the latter, as shown, is provided with a sprocket wheel 10 which is connected to a source of power as later herein described.

In the preferred embodiment of my improved drive mechanism specifically shown in the drawings, the sprocket 10 is advantageously located approximately midway in the length of shaft 8 so as to divide the torsional strains of the latter, and a transmission belt 11 connects said sprocket to a sprocket 12 mounted on the power transmission shaft 13 of a power transmission unit hereinafter more fully described, said shaft 13 receiving power from a motor unit having a motor shaft 14 as indicated.

In order to form a cooperative compact structure of said transmission and motor units, I employ, as shown, a combining support for them in the form of a suitably shaped plate 15, which, as indicated, has a bolting flange 16 for conveniently securing it to rear frame beam 5, and a lock screw 17 facilitating its vertical adjustment and retention on said beam in proper position with relation to wheel 10 on shaft 8.

This plate 15 forms an adequate and convenient support for a simple single speed electric motor 20 of desired economical capacity, which is simply bolted to said plate in any convenient manner and may have, if desired, a floor engaging adjustable foot 21 as shown. The shaft 14 of this motor is preferably provided, for my present purposes, with a plurality of driving sprocket gears 23 and 24, and in order that these may be readily removable and replaced by others for different speed drives, I have provided a special mounting therefor as indicated particularly in Fig. 2.

Such mounting, as shown, comprises a sleeve 25, fitted to the end of shaft 14 and non-rotatably keyed to the latter by a spline 26, the end of said sleeve overhanging said shaft being internally threaded for a nut 27, and its outer surface having a key-way for a pin 28 which engages key ways in gears 23 and 24 fitted to said sleeve. A bolt 29 shown passing through a central aperture in nut 27 to engage threaded aperture 30 in the end of shaft 14 locks said sleeve and its gears to said shaft, but permits ready removal and replacement by another sleeve with a different set of gears, or, if desired, the same sleeve 25 may be used with a change of gears, either method permitting quickly effected change by the knitting operation and with simple tools.

The supporting plate 15 also is adapted, as stated to carry the power transmitting unit, and for this purpose, as shown, its face opposed to the face on which motor 20 is secured is formed with suitable bearings 35, 35, in which power transmission shaft 13 is mounted, the latter, as previously stated carrying sprocket 12 connected by transmission chain 11 to sprocket 10 on hand wheel shaft 8. As shown shaft 13 loosely carries a plurality of sprocket wheels 36 and 37 respectively connected by transmission chains 38 and 39 to drive sprockets 23 and 24 on motor shaft 14; the supporting plate 15 being centrally cut away, as shown, to form a passageway for said transmission chains.

Figure 4:
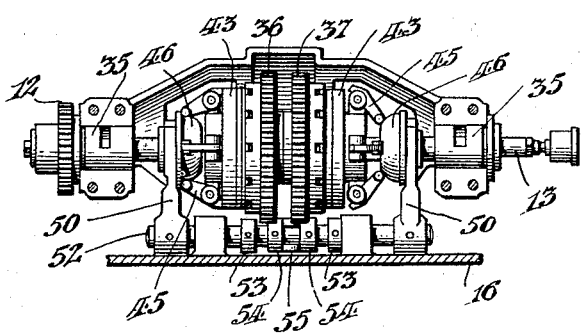
Fig. 4 is a fragmentary longitudinal sectional view taken on the line 4—4 of Fig. 3, and showing the power transmitting shaft with its associated gears and clutch engaging mechanism for the latter, the transmission chains being omitted.

Loose sprockets 36 and 37 are each adapted to be engaged to shaft 13 by some suitable means such as the clutch mechanism indicated in Fig. 4, the clutch mechanism for each being similar and each comprising as shown a shaft secured collar 43 carrying cam levers 45 adapted to be spread by a conical sleeve 46 slidably keyed to shaft 13, said cams acting to engage and disengage a clutch member on its collar 43 with a cooperating clutch member on its respective sprocket gear 36 or 37.

Slide sleeves 46, 46 are shifted by forked levers 50, 50, as shown, fixed to a slide shaft 52, carried in suitable bearings formed on plate-flange 16, said shaft 52 having stop collars 53, 53 to limit its sliding movement. Other collars 54, 54, as shown, control the shaft shifting effect of a forked lever 55, which lever is pivotally carried by a shaft 56 journaled in a suitable bearing 57 of plate unit 15, the other end of said shaft 56 having a lever 58 connected by an adjustable link rod 59 to a clutch shifting lever 60 conveniently located, as shown, adjacent hand wheel shaft 8, and indicated as pivotally supported at 61 on a bracket 62 fixed to front frame beam 6. The shifting of lever 60, as will be readily followed, will shift shaft 52 and slide sleeves 46, 46, to engage one or other of said sprocket gears 36 or 37, such sliding movement, it will be noted, while engaging one gear simultaneously disengages the other, so that said changes may be freely made whether the machine is at rest or being driven. With this clutch control of sprocket gears 36 and 37, the operator may change the drive speed as determined by the variation of the gear ratios employed by a mere shifting of lever 60.

In order to more advantageously utilize the rapid changing of the sprocket gears 23 and 24 on motor shaft 14, before described, it is essential that the transmission chains 38 and 39 may be freely loosened in a simple manner and as freely retightened after replacement of such motor shaft unit. To this end, I preferably employ transmission means which as indicated consists of a plurality of idlers 66, 66 over which transmission chains 38 and 39 extend, and adjustably support said idlers so that they may be shifted as required and then locked in adjusted position. As indicated in the drawings, the idler sprockets 66, 66, are preferably mounted in a housing 70 or protective cover member for drive chains 38, and 39, said housing 70 being secured to plate 15, as shown, and formed with vertical slide ways 71 and 72, and lugs 73 and 74. Each idler sprocket 66 is mounted, as shown, on the end of a stub shaft 75 having a mounting block 76 at its opposite end and an intermediate squared length 77 slidably engaging in its respective housing slide way 71 or 72; and each mounting block is provided with a screw-thread extension 86 engageable with a nut 78 held in its respective lug 73 or 74. By turning said nuts 78, 78, the respective idler sprockets 66, 66 are shifted as required. A housing extension 79 is shown as removably secured to housing 70 to cover and protect drive sprockets 23 and 24, and change of the latter, it will readily be seen, may be simply effected by swinging out of the way or removing said extension 79, manipulating nuts 78, 78 to loosen transmission chains 38 and 39, and removing bolt 29 to permit removal of sleeve 25 and replacement of another having the desired gear ratio. Replacement of bolt 29, tightening of chains 38 and 39 by adjustment of nuts 78, 78, and replacement of housing extension 79 completes the operation, so that the operator may effect the desired speed changes of the drive by a mere shifting of clutch lever 60. It is perfectly conceivable that for certain knitting requirements more than the two variable speeds indicated may be desirable, and such speed may be readily effected by additional sprockets on the motor shaft and additional idler sprockets on the power transmission shaft with suitable selective clutch control therefor as readily understood.

My improved mechanism above fully described provides a variable speed drive mechanism of universal application to old as well as new machines, its compact cooperative structure occupies little room and provides for its ready assembly on the machine with a minimum of labor and effort, its unitary composition provides for simple replacement of worn or damaged parts as required without entire renewal; its simple clutch lever gear shift prevents harmful clash during speed changes; and its simple provision for replacement of the motor drive shaft unit with the proper unit of gears for the particular requirement provides for the most economical utilization of the speed and power of the motor as best adapted for each special requirement. Moreover my improved structure provides for economy of production and standardization of drive not heretofore possible.

Having thus fully described my improved variable speed drive mechanism and the nature of its advantageous adaptation and application to a full-fashioned knitting machine, I do not desire to limit myself to the preferred structure specifically shown in the drawings and referred to in detail, as modifications and changes may be readily devised that are within the spirit and scope of my invention as defined particularly in the following claims.

What I claim is:

1. In combination with a full-fashioned knitting machine having a main frame and a forwardly located power driven shaft, a unitary variable-speed drive mechanism for the latter comprising a base plate secured to the rear portion of said machine frame; said plate having mounted thereon a motor shaft provided with changeable drive gears, a transmission shaft provided with clutch-controlled gears having driving belt connections to said changeable drive gears and with a drive gear connected to said power driven shaft; and means for providing slack in said driving belt connections to enable desired variation of said changeable drive gears.

2. In combination with a full fashioned knitting machine having a main frame and a power driven shaft; a unitary variable speed drive mechanism for the latter comprising a base plate attached to said machine frame, and supporting a motor having a shaft provided with a plurality of removable drive gears, a transmission shaft having a plurality of driven gears combined with selective clutch mechanism for coupling the latter thereto and flexible transmitting means between the gears on said motor and transmission shaft; means connecting said power driven shaft to said transmission shaft; tensioning means for said motion transmitting means; guideways on said base plate, supporting means for said tensioning means movably mounted in said guideways; and cooperating means on said base plate and said supporting means for moving said supporting means to adjustably position said tensioning means for facilitating removal of said gears from said motor shaft.

3. In combination with a full fashioned knitting machine having a main frame and a power driven shaft; a unitary variable speed drive mechanism for said power driven shaft comprising, a motor having a driving shaft, a plurality of driving gears on said motor shaft, a transmission shaft, a plurality of gears coaxially and loosely mounted on said transmission shaft, flexible motion transmitting means between the gears on said motor and transmission shafts, means connecting said power driven shaft to said transmission shaft for operation thereby, and individual clutch mechanism associated with the gears on said transmission shaft and operable to selectively couple said gears thereto for varying the rate of operation of said power driven shaft through said transmission shaft by said motor shaft.

In testimony whereof I affix my signature.

CHRISTIAN F. MEYER.